UNITED STATES PATENT OFFICE 3,476,836
Patented Nov. 4, 1969

3,476,836
PHOSPHORUS DERIVATIVES OF
BENZYLIDENE ANILINE
Thomas M. Melton and David A. Brown, Richmond, Va.,
assignors to Mobil Oil Corporation, New York, N.Y.,
a corporation of New York
No Drawing. Filed June 8, 1966, Ser. No. 555,962
Int. Cl. C07f 9/40; A01n 9/36
U.S. Cl. 260—944                               7 Claims

ABSTRACT OF THE DISCLOSURE

The disclosure is concerned with anilsubstituted aryl phosphorus esters inclusive of N-[4-methylpropylthiophosphinothioyloxy-3-methoxy benzylidene] aniline, and their use as insecticides.

---

This invention relates to a new class of chemical compounds effective against agricultural and household pests, and to a method of using them against these pests. More particularly, the invention relates to new and pesticidally useful compounds of the formula

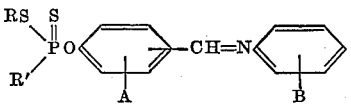

wherein R and R' are lower alkyls, and A and B are each selected from the group consisting of hydrogen, lower alkyl, lower alkoxy, lower haloalkyl, halogen, and nitro.

The compounds of this invention may be prepared by reacting a phosphonochloridodithioate of the formula

wherein R and R' are as above defined, with a substituted benzylidene aniline of the formula

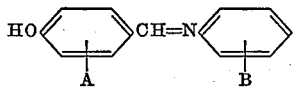

wherein A and B are as defined above, in the presence of a halogen acid acceptor and, if necessary or desirable, an inert organic solvent.

As an alternative, the inventive compounds may be prepared by reacting a phosphonodithioate of the formula

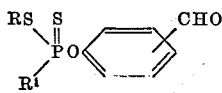

with aniline in the presence of an inert organic solvent.

The invention may be further illustrated by referring to specific embodiments, with the understanding that they are illustrative only and are not intended as limitations upon the invention. In the examples which follow, parts are by weight unless otherwise stated.

EXAMPLE 1

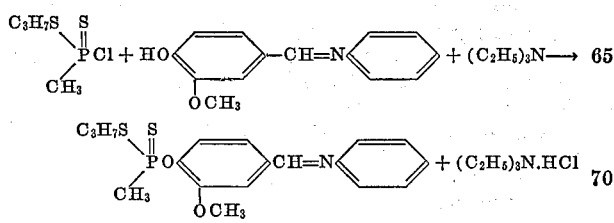

A suitable rector equipped with a reflux condenser, a stirrer, a means for liquid addition, and a thermometer, was charged with 22.7 parts of N-(4'-hydroxy-3'-methoxy-benzylidene) aniline, 10.1 parts of triethylamine, and 88 parts of azeotroped benzene, 18.9 parts of S-propyl methylphosphonochloridodithioate was added to this, with stirring, over one minute at 25° C. The mixture was heated to 60° C. and maintained at this temperature for three hours. The reaction mass was filtered to remove the triethylamine hydrochloride, and then the benzene was removed in vacuo to a final pot temperature of 60° C. The product, obtained in a yield of 82% of theory, had the following analysis.

*Analysis.*—Calc'd: P, 7.72%; S, 16.00%. Found: P, 7.11%; S, 15.58%.

EXAMPLE 2

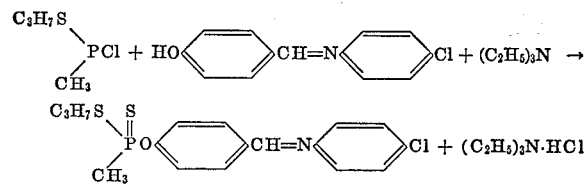

In a method similar to Example 1, 20.5 parts of N-(4'-hydroxybenzylidene)-4-chloro aniline, 9.0 parts of triethylamine and 103.4 parts of dioxane, with 16.7 parts of S-propyl methylphosphonochloridodithioate, gave a 47% yield of product having the following physical and chemical properties:

Refractive index at 26° C. _____ 1.6680
Density 20°/4° C. _____ 1.260
P analysis (percent):
    Calcd. _____ 8.06
    Found (average) _____ 7.72
S analysis (percent):
    Calcd. _____ 16.75
    Found (average) _____ 16.80

EXAMPLE 3

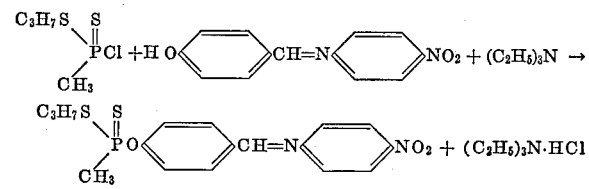

In a method similar to Example 1, 2.19 parts of N-(4'-hydroxy-benzylidene)-4-nitroaniline, 0.9 part of triethylamine, 65.9 parts of benzene, and 1.67 parts of S-propyl methylphosphonochloridodithioate gave 35% of product having the following properties:

Refractive index at 26° C. _____ 1.5813
P analysis (percent):
    Calcd. _____ 7.86
    Found _____ 7.94

EXAMPLE 4

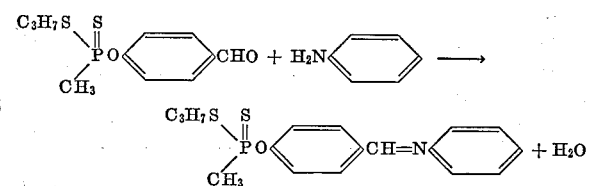

A suitable reactor as per Example 1 was charged with 27.4 parts of O-(4-formylphenyl) S-propyl methylphosphonodithioate, 9.3 parts of aniline, and 88 parts of azeotroped benzene. The charge was heated to reflux (80° C.) and was maintained under this condition, with stirring, for 2 hours. The benzene was removed in vacuo, and residue was distilled, yielding 62% of the product boiling at 194–201° C. at 0.3 mm. of Hg. The product had the following additional properties:

| | |
|---|---|
| Refractive index at 25.5° C. | 1.6153 |
| Density at 20°/4° C. | 1.195 |
| P analysis (percent): | |
| Calcd. | 8.86 |
| Found | 8.67 |
| S analysis (percent): | |
| Calcd. | 18.35 |
| Found | 18.38 |

EXAMPLE 5

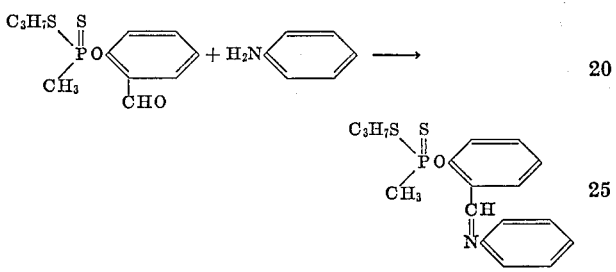

In a method similar to Example 4, 17.9 parts of O-(2-formylphenyl) S-propyl methylphosphonodithioate, 6.1 parts of aniline, and 88 parts of azeotroped benzene gave a yield of 95.6% of undistilled product having the following properties:

| | |
|---|---|
| Refractive index at 25° C. | 1.6338 |
| Density at 20°/4° C. | 1.190 |
| P analysis (percent): | |
| Calcd. | 8.86 |
| Found | 8.18 |

EXAMPLE 6

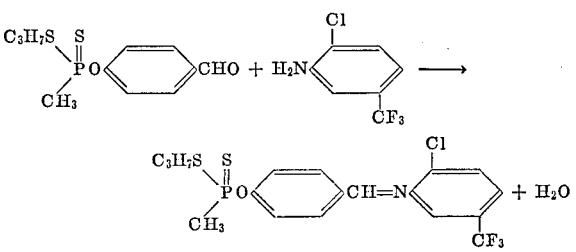

A suitable reactor as defined in Example 1 was charged with 27.4 parts of O-(4-formylphenyl) S-propyl methylphosphonodithioate, 16.0 parts of 2-chloro-5-trifluoromethyl aniline, and 44 parts of azeotroped benzene, and the mixture was heated to reflux (80° C.) over a 30 minute period. After 1½ hours, 1.4 parts of water had been collected. Another 44 parts of benzene was added and heating was continued for an additional hour. The benzene was removed in vacuo, with final stripping being at a pot temperature of 60° C. at 0.10 mm. of Hg. There was obtained 41.3 parts (99.1%) of crude product having the following properties:

| | |
|---|---|
| Refractive index at 24.5° C. | 1.5936 |
| Density at 20°/4° C. | 1.296 |
| P analysis (percent): | |
| Calcd. | 7.44 |
| Found | 7.00 |
| S analysis (percent): | |
| Calcd. | 15.40 |
| Found | 14.67 |

Additional compounds, which may be prepared in a manner similar to the above, and which will further illustrate the scope of the invention, are shown in the following table:

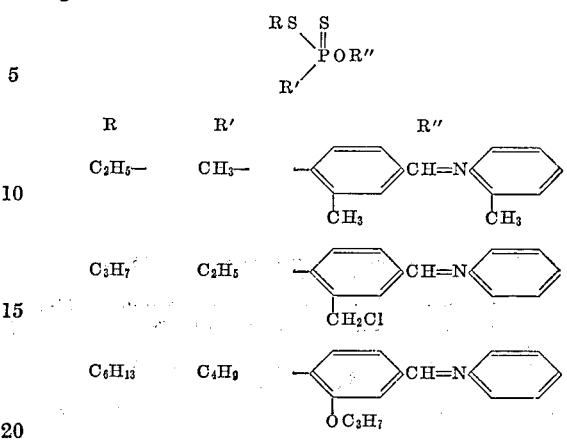

It is to be understood that more highly refined purification techniques may be used than are indicated above, and also that methods therefor may vary according to the product produced. As examples, they may be purified by selective solvent extraction, by filtration over absorptive agents such as activated charcoal, or by recrystallization where the product obtained is a solid. However, the compounds of this invention are generally pure enough in their crude state for use as pesticides, thus requiring no more than filtration and/or solvent removal.

While only triethylamine was disclosed in the above examples as a halogen acid acceptor, it is by no means true that the procedure in the examples utilizing it is limited to this agent. Generally only tertiary amines will be useful. Among the useful amines are the tri-lower alkylamines, and cyclic amines such as pyridine. Primary and secondary amines are not useful because they will react with the chloro intermediate. Additionally, aqueous alkali metal hydroxides are acceptable under certain conditions. Although the chloro intermediate is susceptible to attack by water, aqueous alkali metal hydroxides have been found to be excellent halogen acid acceptors in the present type of system when such factors as temperature and pH are controlled within specified limits.

Dioxane and benzene are not the only useful solvents. There are many others, and without listing them, it will be sufficient to state that generally any inert organic solvent in which the reactants and product are soluble, and which has a boiling point sufficiently below that of the product to allow easy separation, may be utilized.

The compounds of this invention may be used per se as pesticides. Since, however, they are effective at low levels, it is desirable to apply them in the form of solutions or dispersions or solid formulations containing a lethal quantity of the active ingredient.

When a "solution" of the phosphonothioates of the invention is referred to, it is meant that they are of molecular size in any solvent suitable therefor. The chemicals of the invention are generally water insoluble, thus requiring an organic liquid as the solvent. When the inventive chemicals are solubilized, in addition to the requirement that the toxic ingredient be soluble therein at all reasonable levels, phytotoxity of the solvent must be considered. In many applications against insect pests, this factor presents no difficulty. With the advent of extensive use against agricultural pests and the resulting demand for a toxicant which can be sprayed or dusted directly onto the growing plant, however, it has become an important factor. Therefore, the organic solvent used must be one having no phytotoxic effects, or, if it does, the solvent must dissipate quickly enough for such effect to be negligible. For example, acetone will cause plant injury under certain conditions, but when sprayed in the open it evaporates away from the plant, leaving it free from injury.

By "dispersion" is meant that the phosphonothioates of the invention are or may be colloidal in size and distributed throughout a liquid phase as particles held in suspension by wetting agents. The term is also meant to include other suspensions, such as those obtained when using soaps. The dispersive medium is generally aqueous in nature, but it may contain small amounts of organic solvents, i.e., amounts not sufficient to cause solution of the active ingredients.

In addition to aiding in suspending the toxic particles, the wetting or emulsifying agents are useful as aids in uniformly distributing the active materials over the medium to be treated. For example, they aid in preventing build-up of droplets on certain portions of leaves or other plant parts, which results in leaving other portions untouched or insufficiently treated by the toxicant. The useful agents are not phytotoxic, or are used in such small amounts that their toxic effect is negligible. As an example of a useful wetting agent, Tween–20 (polyoxyethylene sorbitan monolaurate) may be mentioned. Others are so well-known to the art that it will serve no purpose to enumerate them here.

"Solid formulations," as used herein, shall be construed to mean all such useful formulations known to the art, whether dust or granular in form. There are many commonly used solid carriers, including kaolin, talc, bentonite, kieselguhr, pyrophyllite, diatomaceous earth, tricalcium phosphate, calcium carbonate, fuller's earth, powdered cork and wood, flour, powdered walnut shells, powdered peanut shells, and the like. The formulations employing these carriers and the phosphonothioates of the invention may be used in dry form, or they may be used in the form of wettable powders containing water and water-soluble surfactants or wetting agents.

In preparing solid formulations, the active ingredient and carrier may be ground together in such a manner and for such a time that an even distribution of the chemical in the solid carrier is obtained. One method involves the direct combination of undiluted toxicant and carrier, with stirring or tumbling to effect proper mixing. This method, however, is generally unsatisfactory since the toxicant tends to become localized, particularly if the carrier is highly absorptive. This leads to a non-uniform formulation. It has been found that a more uniform product can be reproducibly made by dissolving the active ingredient in a volatile solvent such as acetone (usually a 10% solution), adding this to a tumbling mass of the carrier, tumbling further until well-mixed, and then drying in any convenient manner. Drying may, for example, be by applying heat to the tumbling mass, or by spreading the mass into a thin layer and allowing it to air dry.

In addition to the above-discussed formulations, the inventive phosphonothioates may be applied as aerosols, in which case it is convenient to prepare them by dissolving the active ingredient in any suitable solvent and dispersing this solution in dichlorodifluoromethane or other chlorofluoroalkane having a boiling point below room temperature at ambient pressures.

The precise concentration of the chemicals disclosed herein may vary over a considerable range provided a pesticidally active amount thereof is placed upon the pest or in its surroundings. Taking all of the formulations mentioned, the concentration of active ingredient in any one of them may be within the range of 0.001% to 50% by weight. Practically, the amount of ingredient at the point of manufacture may be even higher to allow shipment of less carrier. This creates a savings for the distributor or user, who can add water, water and other agents, or additional solid before sale or use.

On the other hand, as a matter of utility, the formulations will generally contain from about 0.001% to about 1% active ingredient by weight. A somewhat higher rate than 1% may at times be necessary because of pest resistance, weather conditions, and the like, but usually the stated range will give an adequate concentration of active material for pest control.

In controlling or combating agricultural and household pests, the phosphonothioates of this invention, either as such or as part of formulations, may be applied to the insects or to their environment in lethal, pesticidal amounts. This can be done by distributing the active agent, or compositions containing it, on the pest itself or in, on, or around its habitat. Where it is desired to control soilborne pests, the toxicant or composition containing it may be sprayed (if a liquid) or spread (if a solid) over the ground. Thereafter, the material may be left to the natural action of rainfall, or it may be drenched or plowed and disked into the soil. If the host is plant life, a solid formulation may be dusted onto the plant in the same manner as for the application of other powders such as DDT. If a wettable powder is preferred, its manner of application will be similar also to that used for DDT. When employing liquid sprays on plants, a liquid composition containing a pesticidal amount of active ingredient may be sprayed onto the plant just to the point of liquid run-off.

The phosphonothioates of this invention are effective against a wide variety of pests, which term shall be construed to include insects, as well as spiders, mites, ticks, nematodes, and other similar pests.

As illustrative of the pesticidal activity of the chemicals of this invention, the following non-limiting examples are offered.

Procedure for testing against flour beetles

Solutions of the test chemical were prepared so 1 ml. of solution contained 1, 2, 4, or 8 mg. of active material. Three 20 x 90 Petri dishes containing 3 grams of whole wheat flour were prepared for each concentration, 1 ml. of the selected concentration was placed in each dish mixed well with the flour, and the acetone was allowed to evaporate. The flour was then pushed to one side of the dish, and confused flour beetles were placed on the bare side. The dishes were covered, and results were taken 48 hours later and recorded as averages of the three tests.

Procedure for testing against mosquito larvae

Fifty mg. of candidate material was dissolved in 5 ml. of acetone to which 10 drops of Tween–20 had been added. This was added to 95 ml. of water, giving a 500 p.p.m. solution.

A portion of this was diluted to 10 p.p.m. of active ingredient, and 10 mosquito larvae were placed therein. Results were taken 24 hours later, and recorded as averages of three tests.

Procedure for testing against spider mites

A 1000 p.p.m. solution of candidate material was prepared by dissolving 100 mg. of chemical in 5 ml. of acetone containing 10 drops of Tween–20, and diluting to 100 ml. with water.

Mite infested trifoliate bean leaves were momentarily dipped into the 1000 p.p.m. solution, and then placed (stem only) into small bottles containing water. All tests were run in duplicate, and results were taken after 72 hours and recorded as averages.

Procedure for testing against pea aphids

A 500 p.p.m. solution of candidate material was prepared as shown in the mosquito larvae test method.

Ten aphids are placed in a Petri dish. The dish was placed on a turntable rotating at 20 r.p.m. and the aphids were treated by spraying at 10 pounds of pressure with a DeVillbis microsprayer. Tests were run in duplicate and the results recorded, as averages, after 48 hours.

The following table shows the results obtained by testing illustrative compounds from Examples 1–6.

| Compound | Confused Flour Beetle | | Mosquito Larvae | | Spider Mite | | Pea Aphid | |
|---|---|---|---|---|---|---|---|---|
| | Mg. | Percent kill | p.p.m. | Percent kill | p.p.m. | Percent kill | p.p.m. | Percent kill |
| 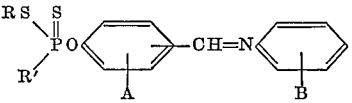 | 8 | 100 | | | | | | |
| | 4 | 100 | | | | | | |
| | 2 | 100 | | | | | | |
| | 1 | 88 | | | | | | |
| 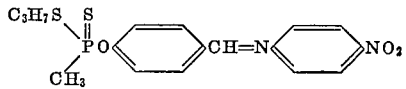 | | | 10 | 100 | 1,000 | 100 | | |
| 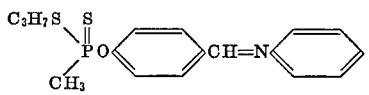 | 8 | 100 | 10 | 100 | | | | |
| | 4 | 76 | | | | | | |
| 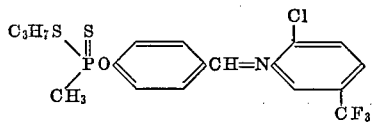 | | | 10 | 80 | | | | |
| 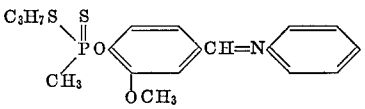 | | | | | | | 500 | 75 |

We claim:
1. A phosphonothioate compound of the formula

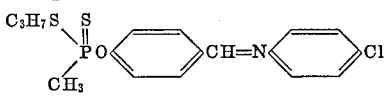

wherein R and R' are lower alkyls, A is selected from the group consisting of hydrogen, methyl, chloromethyl and alkoxy of from 1 to 3 carbon atoms, and B is selected from the group consisting of hydrogen, methyl, trifluoromethyl, chloro and nitro.

2. The compound of claim 1 wherein R is propyl and R' is methyl.
3. The compound of claim 2 having the formula $$\begin{array}{c} C_3H_7S \diagdown \overset{S}{\underset{\|}{P}} O \diagdown \diagup CH=N \diagdown \\ CH_3 \diagup \qquad OCH_3 \end{array}$$

4. The compound of claim 2 having the formula $$\begin{array}{c} C_3H_7S \diagdown \overset{S}{\underset{\|}{P}} O \diagdown \diagup CH=N \diagdown Cl \\ CH_3 \diagup \end{array}$$

5. The compound of claim 2 having the formula $$\begin{array}{c} C_3H_7S \diagdown \overset{S}{\underset{\|}{P}} O \diagdown \diagup CH=N \diagdown NO_2 \\ CH_3 \diagup \end{array}$$

6. The compound of claim 2 having the formula $$\begin{array}{c} C_3H_7S \diagdown \overset{S}{\underset{\|}{P}} O \diagdown \diagup CH=N \\ CH_3 \diagup \end{array}$$

7. The compound of claim 2 having the formula $$\begin{array}{c} C_3H_7S \diagdown \overset{S}{\underset{\|}{P}} O \diagdown \diagup CH=N \diagdown Cl \\ CH_3 \diagup \qquad CF_3 \end{array}$$

No references cited.

CHARLES B. PARKER, Primary Examiner
A. H. SUTTO, Assistant Examiner

U.S. Cl. X.R.
260—945, 973, 968; 424—211